United States Patent
Kim et al.

(10) Patent No.: US 10,547,356 B2
(45) Date of Patent: Jan. 28, 2020

(54) METHOD AND APPARATUS FOR TRANSMITTING CHANNEL STATE INFORMATION IN WIRELESS ACCESS SYSTEM

(71) Applicant: LG ELECTRONICS INC., Seoul (KR)

(72) Inventors: Hyungtae Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/313,423

(22) PCT Filed: Jul. 23, 2015

(86) PCT No.: PCT/KR2015/007668
§ 371 (c)(1),
(2) Date: Nov. 22, 2016

(87) PCT Pub. No.: WO2016/013882
PCT Pub. Date: Jan. 28, 2016

(65) Prior Publication Data

US 2017/0195017 A1    Jul. 6, 2017

Related U.S. Application Data

(60) Provisional application No. 62/028,306, filed on Jul. 23, 2014.

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0456* (2013.01); *H04B 7/0626* (2013.01);
(Continued)

(58) Field of Classification Search
CPC .. H04W 64/00; H04W 64/003; H04L 5/0051; H04L 69/22; H04B 17/336; G01S 5/0236
(Continued)

(56) References Cited

U.S. PATENT DOCUMENTS

2003/0143952 A1* 7/2003 Haller ............... H01M 10/48
455/41.2
2010/0115576 A1* 5/2010 Hale ................. H04N 7/17318
725/152
(Continued)

FOREIGN PATENT DOCUMENTS

CN    103229578 A    7/2013
EP    3174218 A1    5/2017
(Continued)

OTHER PUBLICATIONS

Alcatel-Lucent Shanghai Bell et al., "Considerations on CSI feedback enhancements for high-priority antenna configurations," 3GPP TSG-RAN WG1 #66, R1-112420, Athens, Greece, Aug. 22-26, 2011, 7 pages.
(Continued)

*Primary Examiner* — Shahriar Behnamian
(74) *Attorney, Agent, or Firm* — Birch, Stewart, Kolasch & Birch, LLP

(57) ABSTRACT

A method for a terminal transmitting channel state information (CSI) in a wireless access system that supports massive multiple-input multiple-output (MIMO) according to one embodiment of the present invention may comprise the steps of: receiving CSI configuration information for reporting CSI; and transmitting CSI and identification information with respect to the partial channel corresponding to the CSI of the full channel according to the massive MIMO, on the basis of the CSI configuration information.

10 Claims, 18 Drawing Sheets

(51) Int. Cl.
  *H04B 7/06* (2006.01)
  *H04L 1/00* (2006.01)
  *H04L 25/03* (2006.01)
  *H04W 24/08* (2009.01)
  *H04W 52/42* (2009.01)
  *H04W 72/04* (2009.01)

(52) U.S. Cl.
  CPC ...... *H04L 1/0026* (2013.01); *H04L 25/03343* (2013.01); *H04W 24/08* (2013.01); *H04W 52/42* (2013.01); *H04W 72/0413* (2013.01)

(58) Field of Classification Search
  USPC ......... 455/456.1, 456.2, 456.3, 456.4, 456.5, 455/456.6, 457
  See application file for complete search history.

(56) References Cited

U.S. PATENT DOCUMENTS

| | | | | |
|---|---|---|---|---|
| 2011/0206106 A1* | 8/2011 | Mallik | ................... | H04B 7/024 375/226 |
| 2012/0063500 A1 | 3/2012 | Wang et al. | | |
| 2013/0258964 A1* | 10/2013 | Nam | ................... | H04W 72/046 370/329 |
| 2013/0258965 A1* | 10/2013 | Geirhofer | ........... | H04W 72/048 370/329 |
| 2013/0272151 A1* | 10/2013 | Thomas | ................ | H04W 24/02 370/252 |
| 2014/0010126 A1* | 1/2014 | Sayana | ................ | H04J 3/1694 370/280 |
| 2014/0016549 A1* | 1/2014 | Novlan | ................ | H04B 7/0417 370/328 |
| 2014/0098689 A1* | 4/2014 | Lee | ...................... | H04B 7/0469 370/252 |
| 2015/0043499 A1* | 2/2015 | Yue | .................... | H04W 72/042 370/329 |
| 2016/0072567 A1* | 3/2016 | Kim | .................... | H04B 7/0486 375/267 |

FOREIGN PATENT DOCUMENTS

| | | |
|---|---|---|
| WO | WO 2013/024350 A2 | 2/2013 |
| WO | WO 2016/013882 A1 | 1/2016 |

OTHER PUBLICATIONS

Samsung, "Control signaling to support feedback enhancements in Rel. 10," 63GPP TSG RAN WG1 Meeting #61, R1-103028, Montreal, Canada, May 10-14, 2010, pp. 1-12.

* cited by examiner

FIG. 5
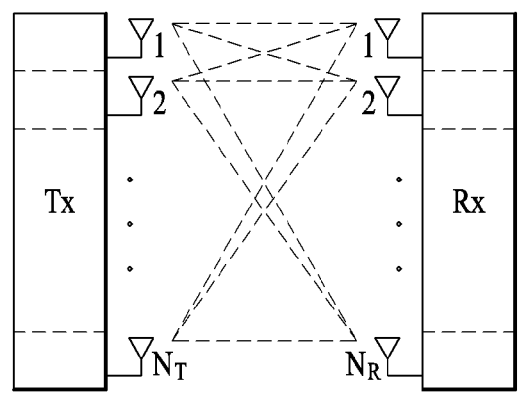
(a)
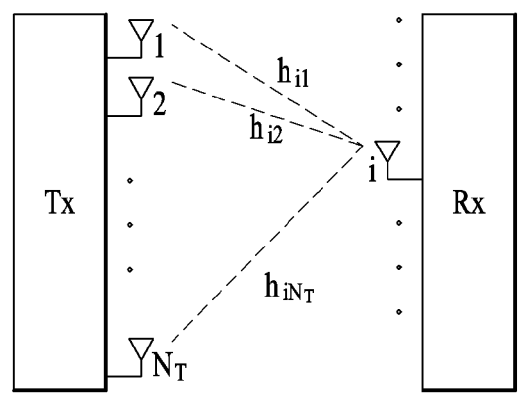
(b)

METHOD AND APPARATUS FOR TRANSMITTING CHANNEL STATE INFORMATION IN WIRELESS ACCESS SYSTEM

CROSS REFERENCE TO RELATED APPLICATIONS

This application is the National Phase of PCT International Application No. PCT/KR2015/007668, filed on Jul. 23, 2015, which claims priority under 35 U.S.C. 119(e) to U.S. Provisional Application No. 62/028,306, filed on Jul. 23, 2014, all of which are hereby expressly incorporated by reference into the present application.

TECHNICAL FIELD

The present invention relates to a wireless communication system and, more particularly, to a method of transmitting channel state information in a wireless access system supporting massive multiple input multiple output (MIMO) and an apparatus supporting the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE

Technical Problem

Based on the above description, hereinafter, a method and apparatus for transmitting channel state information in a wireless access system supporting massive multiple input multiple output (MIMO) will be proposed.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method of, at a user equipment (UE), transmitting channel state information (CSI) in a wireless access system supporting massive multiple input multiple output (MIMO) including receiving CSI configuration information for CSI report and transmitting the CSI and identification information of a partial channel corresponding to the CSI among all channels according to massive MIMO based on the CSI configuration information.

The partial channel may correspond to antennas of a first column of an antenna array according to massive MIMO when the identification information is a first value, and the partial channel may correspond to antennas of a first row of the antenna array according to massive MIMO when the identification information is a second value.

The partial channel may be associated with a single codebook when the identification information is a first value, and the partial channel may be associated with a dual codebook when the identification information is a second value.

A ratio of a feedback frequency of a first partial channel to a feedback frequency of a second partial channel may be a first ratio value when the identification information is a first value, and the ratio of the feedback frequency of the first partial channel to the feedback frequency of the second partial channel may be a second ratio value when the identification information is a second value.

The identification information may be transmitted along with the CSI only when the CSI is a wideband precoding matrix indicator (PMI) and may not be transmitted when the CSI is a narrowband PMI.

The identification information may be fed back along with a rank indicator (RI) and a precoding matrix indicator (PMI) corresponding to the same partial channel may be transmitted until the updated identification information is transmitted along with the RI.

The partial channel information may include a partial CSI indicator (PCI).

In another aspect of the present invention, provided herein is a user equipment (UE) for transmitting channel state information (CSI) in a wireless access system supporting massive multiple input multiple output (MIMO) including a radio frequency (RF) unit and a processor, wherein the processor is configured to receive CSI configuration information for CSI report, and transmit CSI and identification information of a partial channel corresponding to the CSI among all channels according to massive MIMO based on the CSI configuration information.

The partial channel may correspond to antennas of a first column of an antenna array according to massive MIMO when the identification information is a first value, and the partial channel may correspond to antennas of a first row of the antenna array according to massive MIMO when the identification information is a second value.

The partial channel may be associated with a single codebook when the identification information is a first value, and the partial channel may be associated with a dual codebook when the identification information is a second value.

A ratio of a feedback frequency of a first partial channel to a feedback frequency of a second partial channel may be a first ratio value when the identification information is a first value, and the ratio of the feedback frequency of the first partial channel to the feedback frequency of the second partial channel may be a second ratio value when the identification information is a second value.

The identification information may be transmitted along with the CSI only when the CSI is a wideband precoding matrix indicator (PMI) and may not be transmitted when the CSI is a narrowband PMI.

The identification information may be fed back along with a rank indicator (RI) and a precoding matrix indicator (PMI) corresponding to the same partial channel may be transmitted until the updated identification information is transmitted along with the RI.

The partial channel information may include a partial CSI indicator (PCI).

Advantageous Effects

According to the present invention, it is possible to provide a method of transmitting channel state information in a wireless access system supporting massive multiple input multiple output (MIMO) and an apparatus supporting the same.

It will be appreciated by persons skilled in the art that the effects achieved by the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention:

FIG. 5 is a schematic diagram illustrating a wireless communication system having multiple antennas;

BEST MODE

Figure 1:
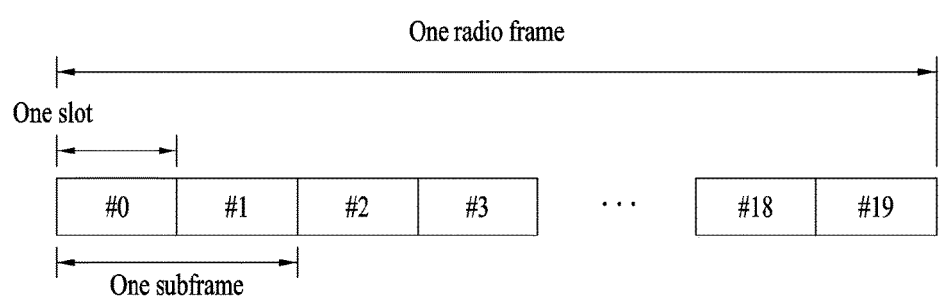
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
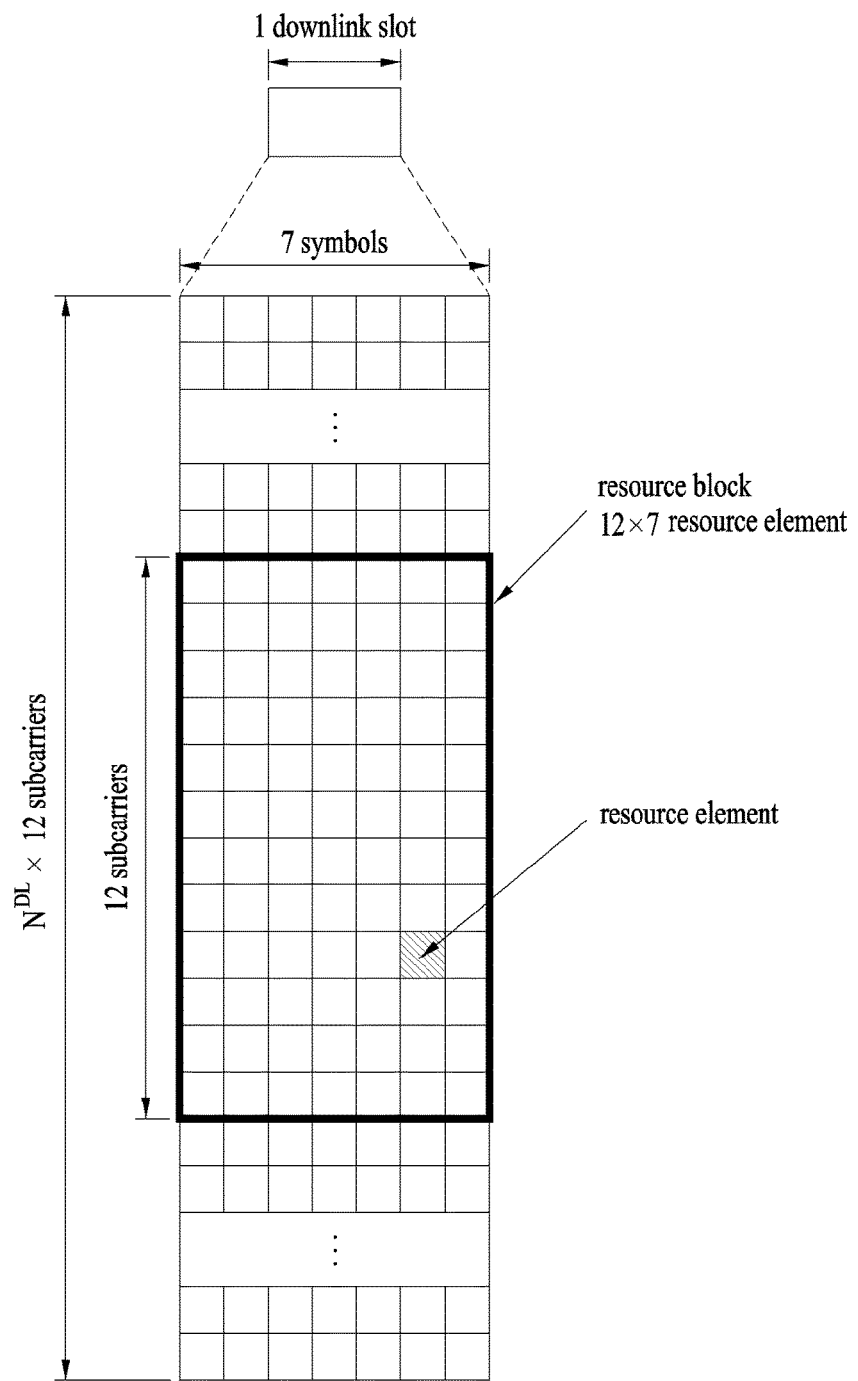
FIG. 2 is a diagram illustrating an example of a resource grid for one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

Figure 3:
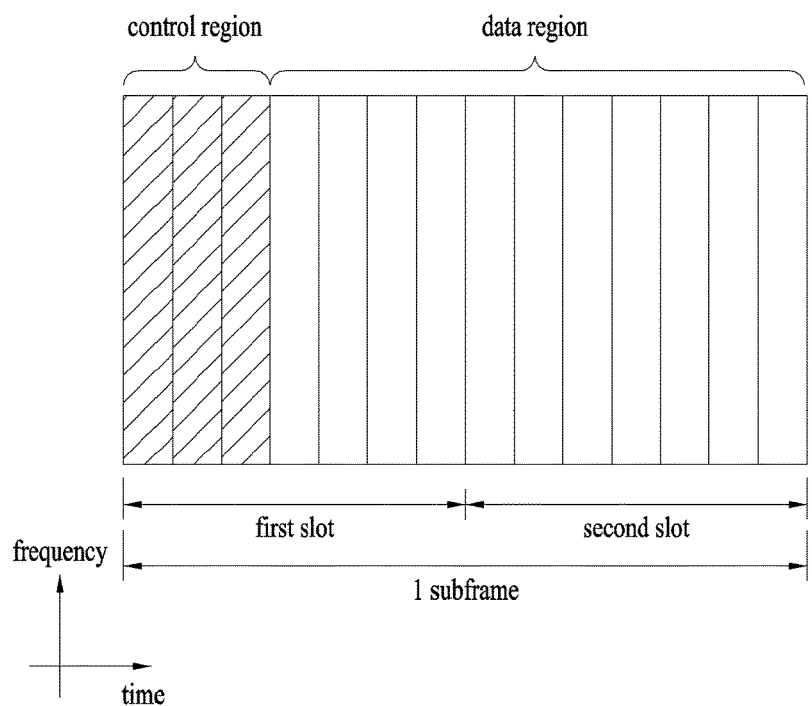
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
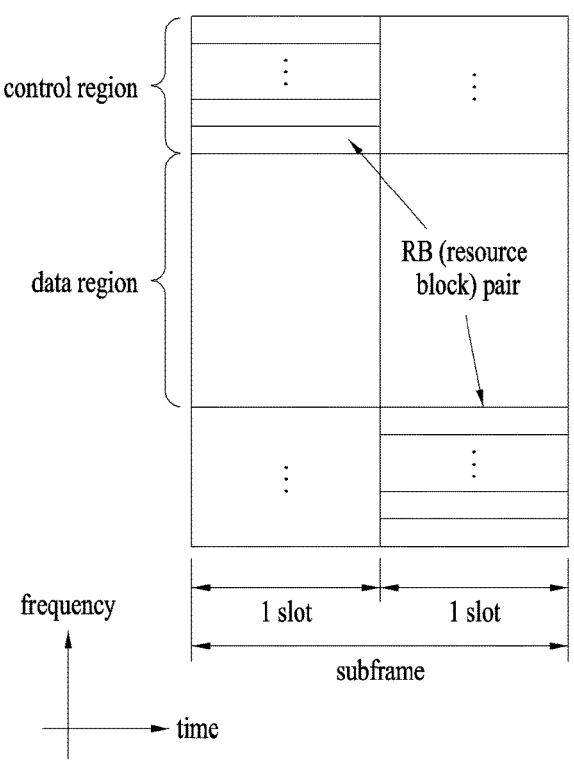
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 shows the configuration of a wireless communication system including multiple antennas. As shown in FIG. 5(a), when both the number of transmit (Tx) antennas and the number of Rx antennas are increased respectively to NT and NR, a theoretical channel transmission capacity of the MIMO communication system increases in proportion to the number of antennas, differently from the case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri).

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted when there are NT Tx antennas. A different transmission power may b applied to each piece of transmission information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix.

Additive white Gaussian noise (AWGN) is added to an actual channel which has passed the channel matrix.

The rank of a matrix is defined as the smaller between the number of independent rows and the number of independent columns in the channel matrix. Accordingly, the rank of the channel matrix is not larger than the number of rows or columns of the channel matrix.

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
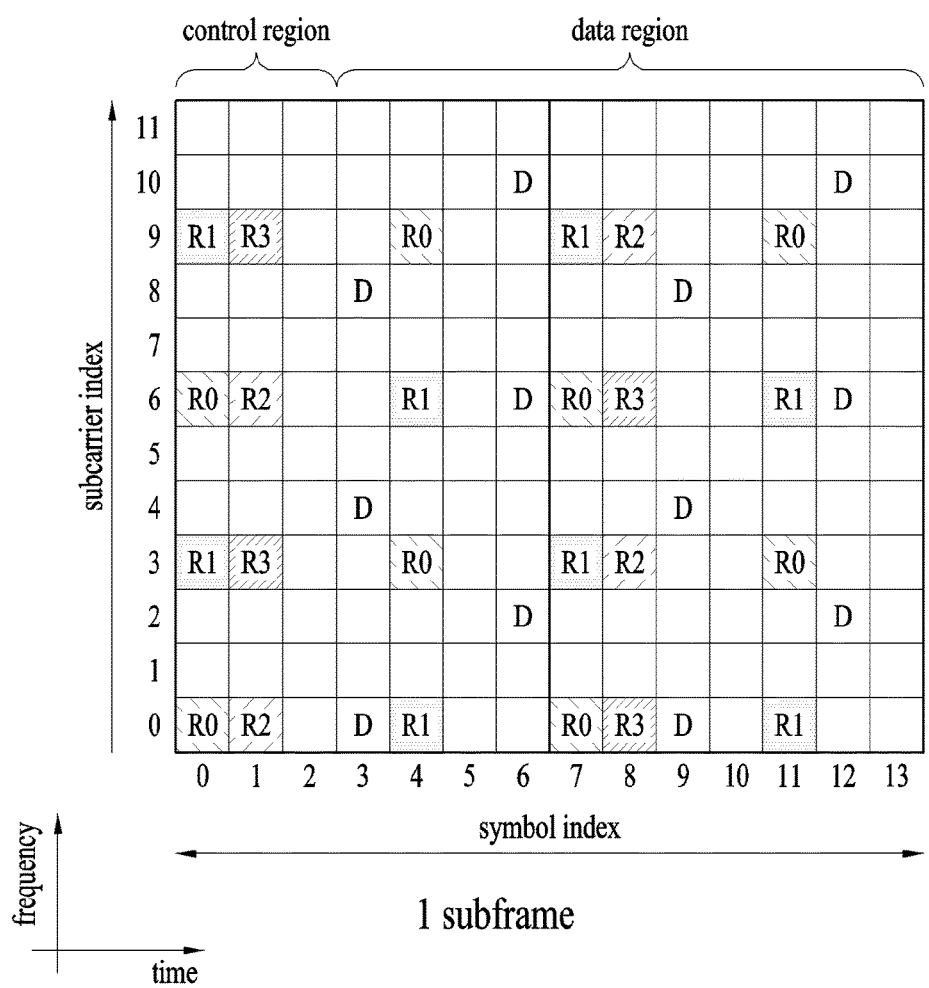
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
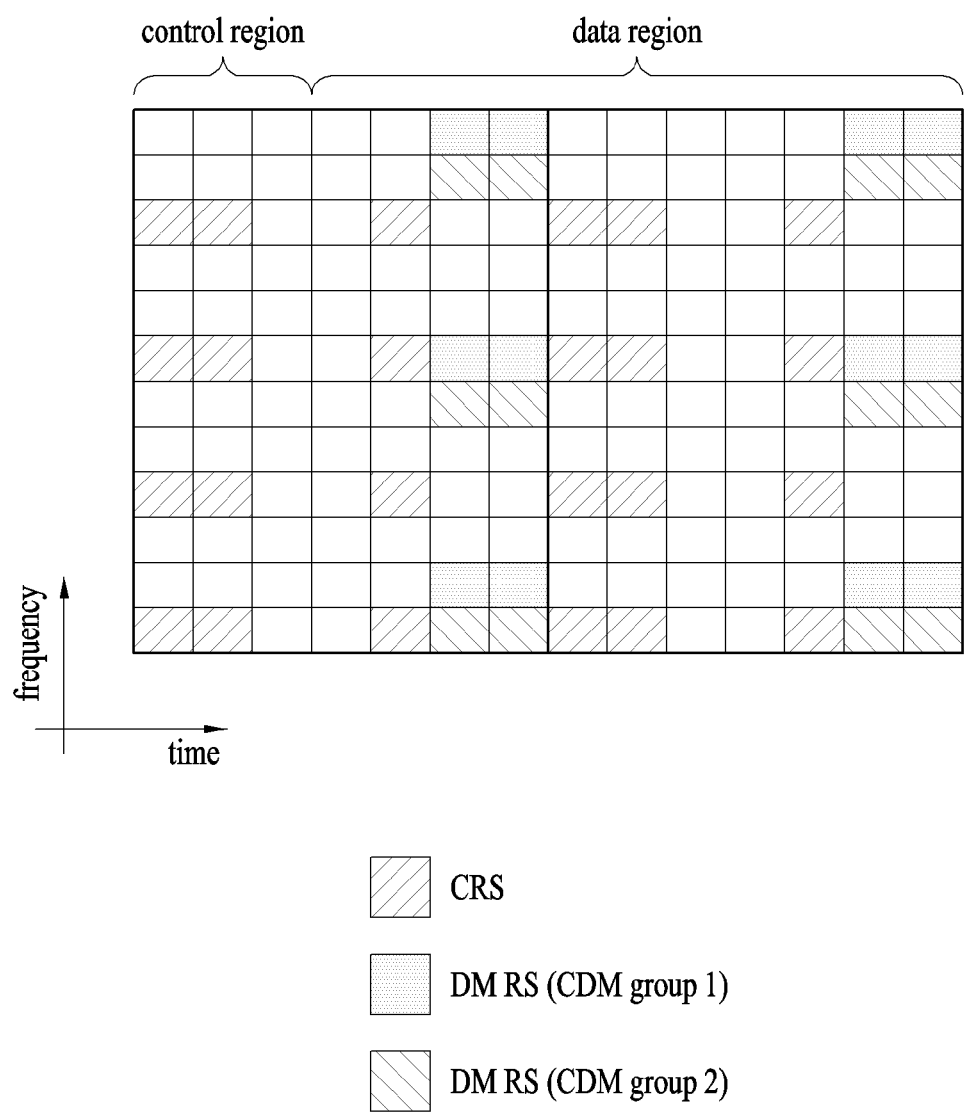
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
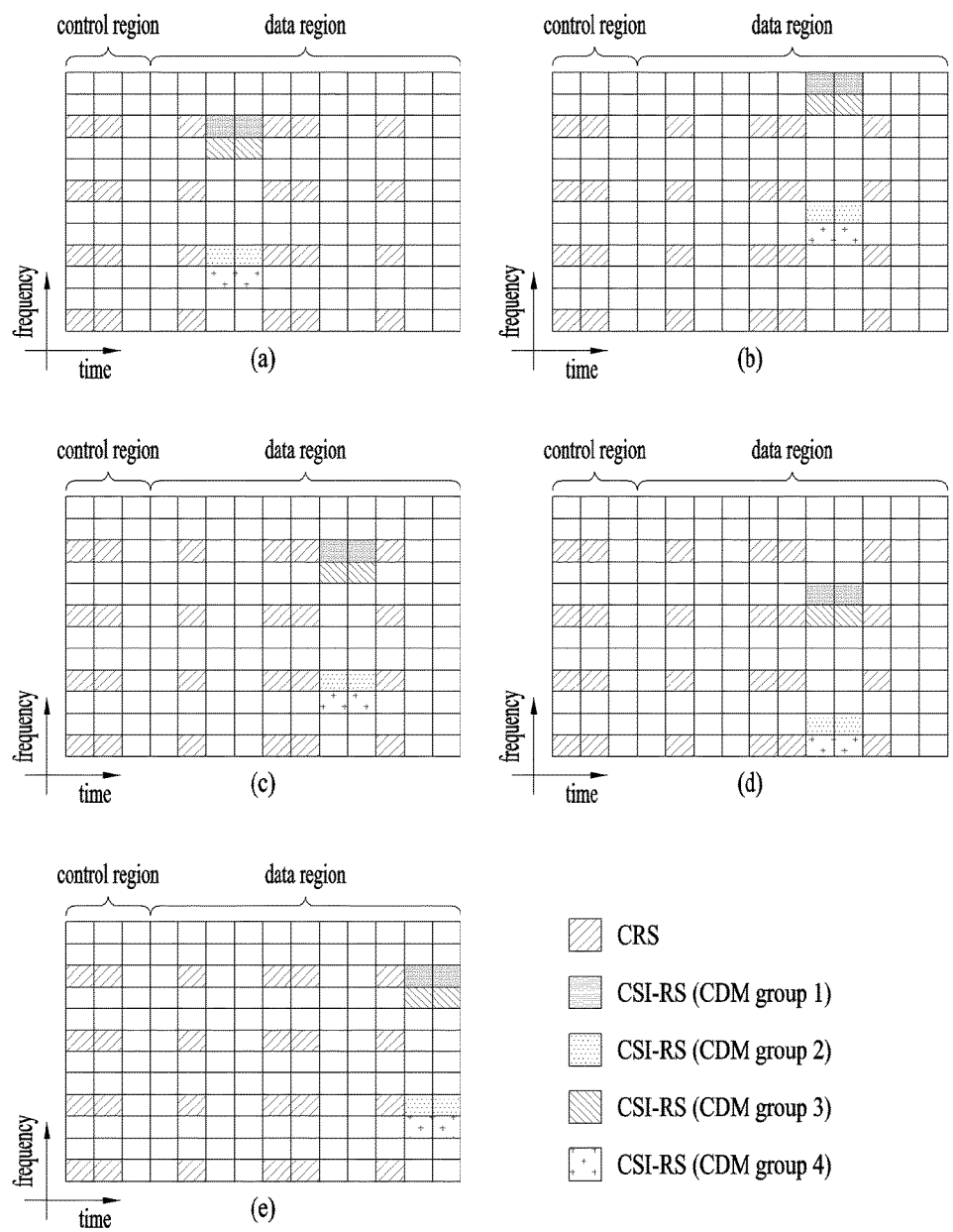
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

RS patterns shown in FIGS. 6 to 8 are disclosed only for illustrative purposes, and the scope or spirit of the present invention are not limited only to a specific RS pattern. That is, even in the case in which RS patterns different from those of FIGS. 6 to 8 are defined and used, various embodiments of the present invention can also be equally applied thereto without difficulty.

CSI-RS Configuration

Among a plurality of CSI-RSs and a plurality of IMRs set to a UE, one CSI process can be defined in a manner of associating a CSI-RS resource for measuring a signal with an interference measurement resource (IMR) for measuring interference. A UE feedbacks CSI information induced from CSI processes different from each other to a network (e.g., base station) with an independent period and a subframe offset.

In particular, each CSI process has an independent CSI feedback configuration. The base station can inform the UE of the CS-RS resource, the IMR resource association information and the CSI feedback configuration via higher layer signaling. For example, assume that three CSI processes shown in Table 1 are set to the UE.

TABLE 1

| CSI Process | Signal Measurement Resource (SMR) | IMR |
|---|---|---|
| CSI process 0 | CSI-RS 0 | IMR 0 |
| CSI process 1 | CSI-RS 1 | IMR 1 |
| CSI process 2 | CSI-RS 0 | IMR 2 |

In Table 1, a CSI-RS 0 and a CSI-RS 1 indicate a CSI-RS received from a cell 1 corresponding to a serving cell of a UE and a CSI-RS received from a cell 2 corresponding to a neighbor cell participating in cooperation, respectively. IMRs set to each of the CSI processes shown in Table 1 are shown in Table 2.

TABLE 2

| IMR | eNB 1 | eNB 2 |
|---|---|---|
| IMR 0 | Muting | Data transmission |
| IMR 1 | Data transmission | Muting |
| IMR 2 | Muting | Muting |

A cell 1 performs muting in an IMR 0 and a cell 2 performs data transmission in the IMR 0. A UE is configured to measure interference from other cells except the cell 1 in the IMR 0. Similarly, the cell 2 performs muting in an IMR 1 and the cell 1 performs data transmission in the IMR 1. The UE is configured to measure interference from other cells except the cell 2 in the IMR 1. The cell 1 and the cell 2 perform muting in an IMR 2 and the UE is configured to measure interference from other cells except the cell 1 and the cell 2 in the IMR 2.

Hence, as shown in Table 1 and Table 2, if data is received from the cell 1, CSI information of the CSI process 0 indicates optimized RI, PMI and CQI information. If data is received from the cell 2, CSI information of the CSI process 1 indicates optimized RI, PMI and CQI information. If data is received from the cell 1 and there is no interference from the cell 2, CSI information of the CSI process 2 indicates optimized RI, PMI and CQI information.

It is preferable for a plurality of CSI processes set to a UE to share values subordinate to each other. For example, in case of joint transmission performed by the cell 1 and the cell 2, if a CSI process 1 considering a channel of the cell 1 as a signal part and a CSI process 2 considering a channel of the cell 2 as a signal part are set to a UE, it is able to easily perform JT scheduling only when ranks of the CSI process 1 and the CSI process 2 and a selected subband index are identical to each other.

A period or a pattern of transmitting a CSI-RS can be configured by a base station. In order to measure the CSI-RS, a UE should be aware of CSI-RS configuration of each CSI-RS antenna port of a cell to which the UE belongs thereto. The CSI-RS configuration can include a DL subframe index in which the CSI-RS is transmitted, time-frequency location of a CSI-RS resource element (RE) in a transmission subframe (e.g., the CSI-RS patterns shown in FIGS. 8(a) to 8(e)) and a CSI-RS sequence (a sequence used for a CSI-RS usage, the sequence is pseudo-randomly generated according to a prescribed rule based on a slot number, a cell ID, a CP length and the like), etc. In particular, a plurality of CSI-RS configurations can be used by a random (given) base station and the base station can inform a UE(s) in a cell of a CSI-RS configuration to be used for the UE(s).

Since it is necessary to identify a CSI-RS for each antenna port, resources to which the CSI-RS for each antenna port is transmitted should be orthogonal to each other. As mentioned earlier with reference to FIG. 8, the CSI-RS for each antenna port can be multiplexed by the FDM, the TDM and/or the CDM scheme using an orthogonal frequency resource, an orthogonal time resource and/or an orthogonal code resource.

When the base station informs the UEs in a cell of information on a CSI-RS (CSI-RS configuration), it is necessary for the base station to preferentially inform the UEs of information on time-frequency to which the CSI-RS for each antenna port is mapped. Specifically, information on time can include numbers of subframes in which a CSI-RS is transmitted, a period of transmitting a CSI-RS, a subframe offset of transmitting a CSI-RS, an OFDM symbol number in which a CSI-RS resource element (RE) of a specific antenna is transmitted, etc. Information on frequency can include a frequency space of transmitting a CSI-RS resource element (RE) of a specific antenna, an RE offset on a frequency axis, a shift value, etc.

Figure 9:
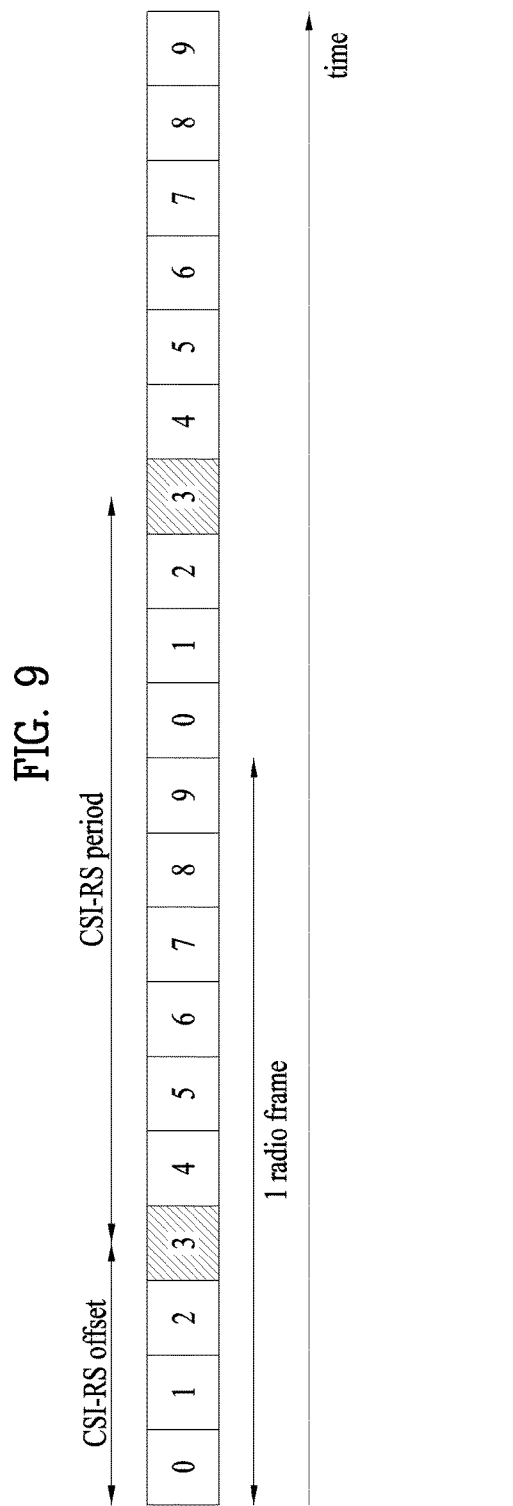
FIG. 9 is a diagram for explaining an example of a scheme of periodically transmitting a CSI-RS.

FIG. 9 is a diagram for explaining an example of a scheme of periodically transmitting a CSI-RS. A CSI-RS can be periodically transmitted with a period of an integer multiple of a subframe (e.g., 5-subframe period, 10-subframe period, 20-subframe period, 40-subframe period or 80-subframe period).

FIG. 9 shows a radio frame configured by 10 subframes (subframe number 0 to 9). In FIG. 9, for example, a transmission period of a CSI-RS of a base station corresponds to 10 ms (i.e., 10 subframes) and a CSI-RS transmission offset corresponds to 3. The offset value may vary depending on a base station to make CSI-RSs of many cells to be evenly distributed in time domain. If a CSI-RS is transmitted with a period of 10 ms, an offset value may have one selected from among 0 to 9. Similarly, if a CSI-RS is transmitted with a period of 5 ms, an offset value may have one selected from among 0 to 4. If a CSI-RS is transmitted with a period of 20 ms, an offset value may have one selected from among 0 to 19. If a CSI-RS is transmitted with a period of 40 ms, an offset value may have one selected from among 0 to 39. If a CSI-RS is transmitted with a period of 80 ms, an offset value may have one selected from among 0 to 79. The offset value corresponds to a value of a subframe in which CSI-RS transmission starts by a base station transmitting a CSI-RS with a prescribed period. If the base station informs a UE of a transmission period of a CSI-RS and an offset value, the UE is able to receive the CSI-RS of the base station at a corresponding subframe position using the transmission period and the offset value. The UE measures a channel through the received CSI-RS and may be then able to report such information as a CQI, a PMI and/or an RI (rank indicator) to the base station. In the present disclosure, the CQI, the PMI and/or the RI can be commonly referred to as CQI (or CSI) except a case of individually explaining the CQI, the PMI and/or the RI. And, the CSI-RS transmission period and the offset can be separately designated according to a CSI-RS configuration.

Figure 10:
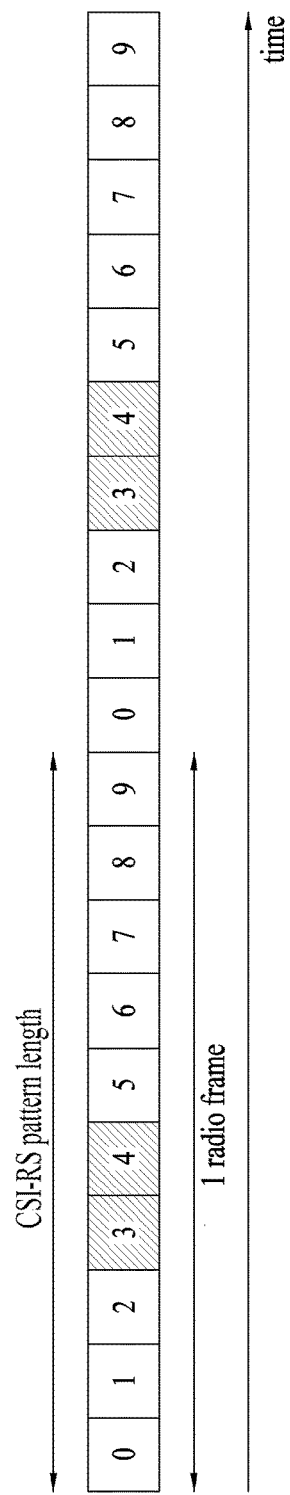
FIG. 10 is a diagram for explaining an example of a scheme of aperiodically transmitting a CSI-RS.

FIG. 10 is a diagram for explaining an example of a scheme of aperiodically transmitting a CSI-RS. In FIG. 10, for example, one radio frame is configured by 10 subframes (subframe number 0 to 9). As shown in FIG. 10, a subframe in which a CSI-RS is transmitted can be represented as a specific pattern. For example, a CSI-RS transmission pattern can be configured by a 10-subframe unit and whether to transmit a CSI-RS can be indicated by a 1-bit indicator in each subframe. An example of FIG. 10 shows a pattern of transmitting a CSI-RS in a subframe index 3 and 4 among 10 subframes (subframe index 0 to 9). The indicator can be provided to a UE via higher layer signaling.

As mentioned in the foregoing description, configuration of CSI-RS transmission can be variously configured. In order to make a UE properly receive a CSI-RS and perform channel measurement, it is necessary for a base station to inform the UE of CSI-RS configuration. Embodiments of the present invention for informing a UE of CSI-RS configuration are explained in the following.

Method of Indicating CSI-RS Configuration

In general, a base station is able to inform a UE of CSI-RS configuration by one of two schemes in the following.

A first scheme is a scheme that a base station broadcasts information on CSI-RS configuration to UEs using dynamic broadcast channel (DBCH) signaling.

In a legacy LTE system, when a base station informs UEs of contents on system information, the information is transmitted to the UEs via a BCH (broadcasting channel). Yet, if the contents are too much and the BCH is unable to carry all of the contents, the base station transmits the system information using a scheme used for transmitting a general downlink data. And, PDCCH CRC of corresponding data is transmitted in a manner of being masked using SI-RNTI, i.e., system information RNTI, instead of a specific UE ID (e.g., C-RNTI). In this case, actual system information is transmitted to a PDSCH region together with a general unicast data. By doing so, all UEs in a cell decode PDCCH using the SI-RNTI, decode PDSCH indicated by the corresponding PDCCH and may be then able to obtain the system information. This type of broadcasting scheme may be referred to as a DBCH (dynamic BCH) to differentiate it from a general broadcasting scheme, i.e., PBCH (physical BCH).

Meanwhile, system information broadcasted in a legacy LTE system can be divided into two types. One is a master information block (MIB) transmitted on the PBCH and another one is a system information block (SIB) transmitted on a PDSCH region in a manner of being multiplexed with a general unicast data. In the legacy LTE system, since informations transmitted with an SIB type 1 to an SIB type 8 (SIB1 to SIB8) are already defined, it may be able to define a new SIB type to transmit information on a CSI-RS configuration corresponding to new system information not defined in the legacy SIB types. For example, it may be able to define SIB9 or SIB10 and the base station can inform UEs within a cell of the information on the CSI-RS configuration via the SIB9 or the SIB10 using a DBCH scheme.

A second scheme is a scheme that a base station informs each UE of information on CSI-RS configuration using RRC (radio resource control) signaling. In particular, the information on the CSI-RS can be provided to each of the UEs within a cell using dedicated RRC signaling. For example, in the course of establishing a connection with the base station via an initial access or handover of a UE, the base station can inform the UE of the CSI-RS configuration via RRC signaling. Or, when the base station transmits an RRC signaling message, which requires channel status feedback based on CSI-RS measurement, to the UE, the base station can inform the UE of the CSI-RS configuration via the RRC signaling message.

Indication of CSI-RS Configuration

A random base station may use a plurality of CSI-RS configurations and the base station can transmit a CSI-RS according to each of a plurality of the CSI-RS configurations to a UE in a predetermined subframe. In this case, the base station informs the UE of a plurality of the CSI-RS configurations and may be able to inform the UE of a CSI-RS to be used for measuring a channel state for making a feedback on a CQI (channel quality information) or CSI (channel state information).

Embodiments for a base station to indicate a CSI-RS configuration to be used in a UE and a CSI-RS to be used for measuring a channel are explained in the following.

Figure 11:
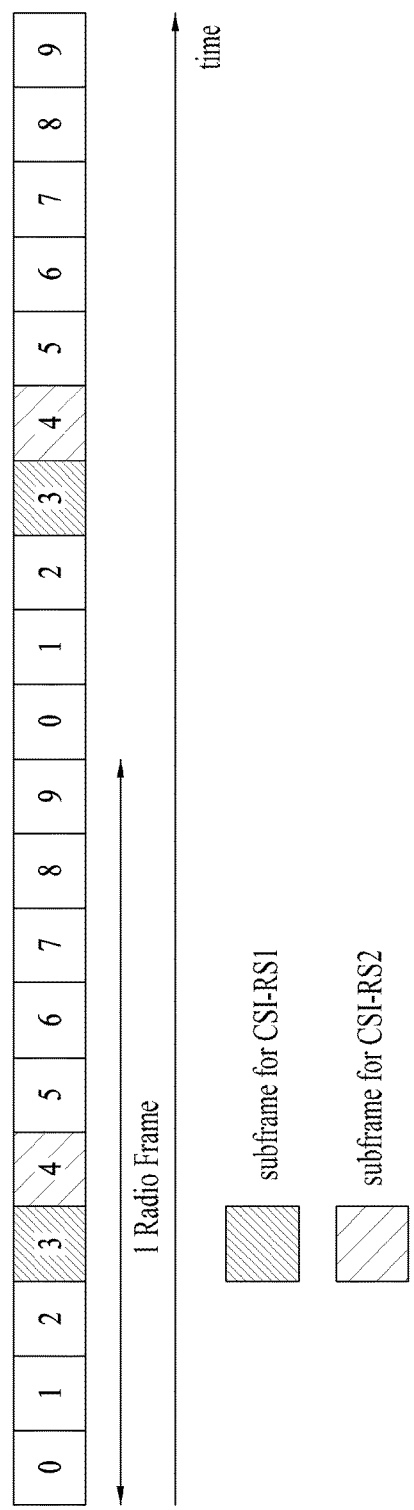
FIG. 11 is a diagram for explaining an example of using two CSI-RS configurations.

FIG. 11 is a diagram for explaining an example of using two CSI-RS configurations. In FIG. 11, for example, one radio frame is configured by 10 subframes (subframe number 0 to 9). In FIG. 11, in case of a first CSI-RS configuration, i.e., a CSI-RS1, a transmission period of a CSI-RS is 10 ms and a transmission offset of a CSI-RS is 3. In FIG. 11, in case of a second CSI-RS configuration, i.e., a CSI-RS2, a transmission period of a CSI-RS is 10 ms and a transmission offset of a CSI-RS is 4. A base station informs a UE of information on two CSI-RS configurations and may be able to inform the UE of a CSI-RS configuration to be used for CQI (or CSI) feedback among the two CSI-RS configurations.

If the base station asks the UE to make a CQI feedback on a specific CSI-RS configuration, the UE can perform channel state measurement using a CSI-RS belonging to the CSI-RS configuration only. Specifically, a channel state is determined based on CSI-RS reception quality, an amount of noise/interference and a function of a correlation coefficient. In this case, the CSI-RS reception quality is measured using the CSI-RS belonging to the CSI-RS configuration only. In order to measure the amount of noise/interference and the correlation coefficient (e.g., an interference covariance matrix indicating interference direction, etc.), measurement can be performed in a subframe in which the CSI-RS is transmitted or a subframe designated in advance. For example, in the embodiment of FIG. 11, if the base station asks the UE to make a feedback on the first CSI-RS configuration (CSI-RS 1), the UE measures reception quality using a CSI-RS transmitted in a fourth subframe (a subframe index 3) of a radio frame and the UE can be separately designated to use an add number subframe to measure the amount of noise/interference and the correlation coefficient. Or, it is able to designate the UE to measure the CSI-RS reception quality, the amount of noise/interference and the correlation coefficient in a specific single subframe (e.g., a subframe index 3) only.

For example, reception signal quality measured using a CSI-RS can be simply represented by SINR (signal-to-interference plus noise ratio) as S/(I+N) (in this case, S corresponds to strength of a reception signal, I corresponds to an amount of interference and N corresponds to an amount of noise). The S can be measured through a CSI-RS in a subframe including the CSI-RS in a subframe including a signal transmitted to a UE. Since the I and the N change according to an amount of interference received from a neighbor cell, direction of a signal received from a neighbor cell, and the like, the I and the N can be measured by a CRS transmitted in a subframe in which the S is measured or a separately designated subframe, etc.

In this case, the amount of noise/interference and the correlation coefficient can be measured in a resource element (RE) in which a CRS belonging to a corresponding subframe or a CSI-RS is transmitted. Or, in order to easily measure noise/interference, the noise/interference can be measured through a configured null RE. In order to measure noise/interference in a CRS or CSI-RS RE, a UE preferentially recovers a CRS or a CSI-RS and subtracts a result of the recovery from a reception signal to make a noise and interference signal to be remained only. By doing so, the UE is able to obtain statistics of noise/interference from the remained noise and the interference signal. A null RE may correspond to an empty RE (i.e., transmission power is 0 (zero)) in which no signal is transmitted by a base station. The null RE makes other base stations except the corresponding base station easily measure a signal. In order to measure an amount of noise/interference, it may use all of a CRS RE, a CSI-RS RE and a null RE. Or, a base station may designate REs to be used for measuring noise/interference for a UE. This is because it is necessary to properly designate an RE to be used for measuring noise/interference measured by the UE according to whether a signal of a neighbor cell transmitted to the RE corresponds to a data signal or a control signal. Since the signal of the neighbor cell transmitted to the RE varies according to whether or not synchronization between cells is matched, a CRS configuration, a CSI-RS configuration and the like, the base station identifies the signal of the neighbor cell and may be able to designate an RE in which measurement is to be performed for the UE. In particular, the base station can designate the UE to measure noise/interference using all or a part of the CRS RE, the CSI-RS RE and the null RE.

For example, the base station may use a plurality of CSI-RS configurations and may be able to inform the UE of a CSI-RS configuration to be used for CQI feedback and a null RE position while informing the UE of one or more CSI-RS configurations. In order to distinguish the CSI-RS configuration to be used for CQI feedback by the UE from a null RE transmitted by zero transmission power, the CSI-RS configuration to be used for CQI feedback by the UE may correspond to a CSI-RS configuration transmitted by non-zero transmission power. For example, if the base station informs the UE of a CSI-RS configuration in which the UE performs channel measurement, the UE can assume that a CSI-RS is transmitted by non-zero transmission power in the CSI-RS configuration. In addition, if the base station informs the UE of a CSI-RS configuration transmitted by zero transmission power (i.e., null RE position), the UE can assume that an RE position of the CSI-RS configuration corresponds to zero transmission power. In other word, when the base station informs the UE of a CSI-RS configuration of non-zero transmission power, if there exists a CSI-RS configuration of zero transmission power, the base station can inform the UE of a corresponding null RE position.

As a modified example of the method of indicating a CSI-RS configuration, the base station informs the UE of a plurality of CSI-RS configurations and may be able to inform the UE of all or a part of CSI-RS configurations to be used for CQI feedback among a plurality of the CSI-RS configurations. Hence, having received a request for CQI feedback on a plurality of the CSI-RS configurations, the UE measures a CQI using a CSI-RS corresponding to each CSI-RS configuration and may be then able to transmit a plurality of CQI information to the base station.

Or, in order to make the UE transmit a CQI for each of a plurality of the CSI-RS configurations, the base station can designate an uplink resource, which is necessary for the UE to transmit the CQI, in advance according to each CSI-RS configuration. Information on the uplink resource designation can be provided to the UE in advance via RRC signaling.

Or, the base station can dynamically trigger the UE to transmit a CQI for each of a plurality of CSI-RS configurations to the base station. Dynamic triggering of CQI transmission can be performed via PDCCH. It may inform the UE of a CSI-RS configuration for which a CQI is to be measured via PDCCH. Having received the PDCCH, the UE can feedback a CQI measurement result measured for the CSI-RS configuration designated by the PDCCH to the base station.

A transmission timing of a CSI-RS corresponding to each of a plurality of the CSI-RS configurations can be designated to be transmitted in a different subframe or an identical subframe. If CSI-RSs according to CSI-RS configurations different from each other are designated to be transmitted in an identical subframe, it may be necessary to distinguish the CSI-RSs from each other. In order to distinguish the CSI-RSs according to the CSI-RS configurations different from each other, it may be able to differently apply at least one selected from the group consisting of a time resource, a frequency resource and a code resource of CSI-RS transmission. For example, an RE position in which a CSI-RS is transmitted can be differently designated in a subframe according to a CSI-RS configuration (e.g., a CSI-RS according to one CSI-RS configuration is designated to be transmitted in an RE position shown in FIG. 8 (a) and a CSI-RS according to another CSI-RS configuration is designated to be transmitted in an RE position shown in FIG. 8 (b)) (distinction using a time and frequency resource). Or, if CSI-RSs according to CSI-RS configurations different from each other are transmitted in an identical RE position, the CSI-RSs can be distinguished from each other by differently using a CSI-RS scrambling code in the CSI-RS configurations different from each other (distinction using a code resource).

AAS (Active Antenna System)

After LTE release-12, an antenna system using an AAS has been introduced. The AAS includes active antennas each including an active circuit. The AAS may reduce interference or more efficiently perform beamforming by changing an antenna pattern according to situation. When such an AAS is two-dimensionally established (2D-AAS), a main lobe of an antenna may be more efficiently adjusted in three dimensions in terms of the antenna pattern, thereby actively changing a transmitted beam according to the location of a reception apparatus.

Figure 12:
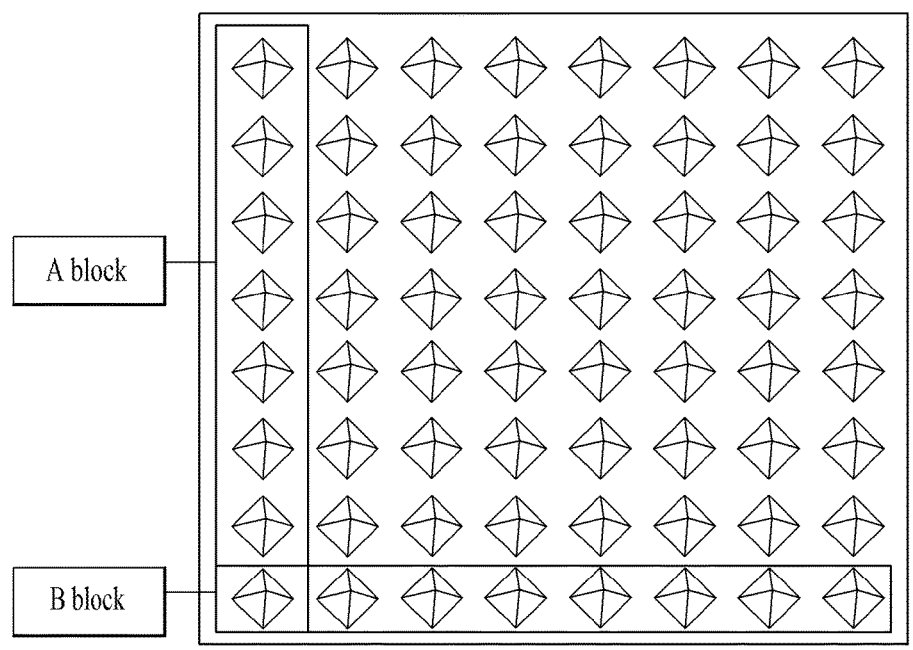
FIG. 12 is a diagram showing an example of a 2D-AAS antenna array of 64 ports.

FIG. 12 is a diagram showing an example of a 2D-AAS antenna array of 64 ports.

Referring to FIG. 12, in the 2D-AAS, antennas may be provided in a vertical direction and a horizontal direction to establish a large number of antenna systems.

If the 2D-AAS is introduced, in order to notify a reception apparatus of a channel from a transmission apparatus to the reception apparatus, the transmission apparatus sends a specific RS (for example, CSI-RS, hereinafter, referred to as "CSI-RS" for convenience). In a current LTE system, a 1-port CSI-RS, a 2-port CSI-RS and an 8-port CSI-RS are designed as a CSI-RS. In the case of an n-port CSI-RS (n>1), n REs should be used in one RB. Accordingly, in the case of the 2D-AAS, if a total of 64 antennas including eight antennas in a vertical direction and eight antennas in a horizontal direction is provided, in a conventional method, 64 REs should be used in one RB, for the CSI-RS. Accordingly, a problem such as CSI-RS overhead according to the number of antennas may occur.

In order to solve such a problem, a method of estimating, using some CSI-RS ports, channels from the remaining ports may be used. To this end, a channel from an 2D-AAS to a reception apparatus may be estimated using a Kronecker product as follows.

$$H = \begin{bmatrix} H_T^{(1)} \\ H_T^{(2)} \\ \vdots \\ H_T^{(j)} \\ \vdots \\ H_T^{(N_R)} \end{bmatrix} = \begin{bmatrix} H_V^{(1)} \otimes H_H^{(1)} \\ H_V^{(2)} \otimes H_H^{(2)} \\ \vdots \\ H_V^{(j)} \otimes H_H^{(j)} \\ \vdots \\ H_V^{(N_R)} \otimes H_H^{(N_R)} \end{bmatrix} \qquad \text{Equation 1}$$

In Equation 1, H denotes all channels from the transmission apparatus to the reception apparatus and $H_T(j)$ denotes a channel from the transmission apparatus to a j-th reception antenna. $H_V(j)$ and $H_H(j)$ denote channels from antenna elements (or ports) of the vertical direction and the horizontal direction to the j-th antenna of the reception apparatus, respectively. In FIG. 12, $H_V(j)$ denotes a channel from the antennas of a block A to the j-th antenna of the reception apparatus on the assumption that only the antennas of the block A are present. $H_H(j)$ denotes a channel from the antennas of a block B to the j-th antenna of the reception apparatus on the assumption that only the antennas of the block B are present.

Hereinafter, for convenience of description, one arbitrary receive antenna will be described and all processes are applicable to the other receive antennas. In addition, only a channel from the transmission apparatus to one arbitrary receive antenna, from which an index j is omitted, will be described.

$$H_T = H_V \otimes H_H \qquad \text{Equation 2}$$

Equation 2 illustrates the present invention and the present invention is applicable to an actual channel different from Equation 2.

One CSI-RS having $N_V$ antenna ports in the vertical direction like the block A of FIG. 12 and one CSI-RS having $N_H$ antenna ports in the horizontal direction like the block B may be configured, thereby configuring two CSI-RSs. The reception apparatus may measure the received two CSI-RSs and then perform Kronecker product with respect to the two channel matrices as shown in Equation 2, thereby estimating the channel. $N_V$ is the number of antennas in the vertical direction and $N_H$ is the number of antennas in the horizontal direction. If this method is used, the reception apparatus may be notified of channels from 64 ports using only 2-, 4- and 8-port CSI-RSs.

Figure 13:
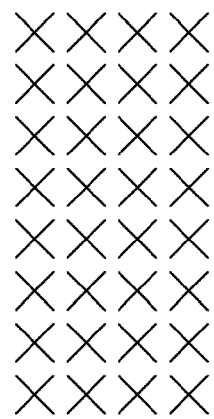
FIG. 13 is a diagram showing an example of a cross-polarized (X-pol) antenna array (AA)

Instead of a co-polarized antenna array shown in FIG. 12, a cross-polarized antenna array (hereinafter, referred to as X-pol AA) shown in FIG. 13 may be considered. In this case, a 64-port antenna array may be composed of 8 rows/4 columns×2 polarization as shown in FIG. 13.

Figure 14:
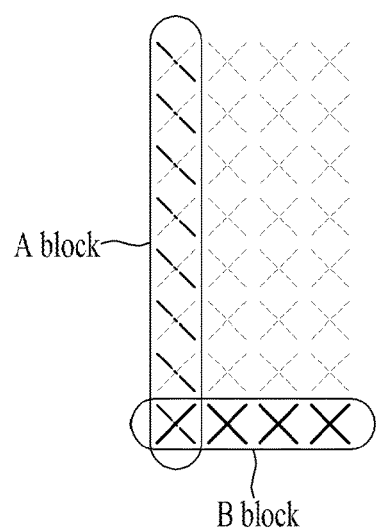
FIG. 14 is a diagram showing an example of a block A/B in an X-pol AA.

FIG. 14 is a diagram showing an example of a block AB in an X-pol AA.

In summary, in an N-tx massive MIMO environment in which a base station has a large number of transmit antennas, an N-Tx CSIRS and an N-Tx PMI should be newly defined for CSI feedback. However, upon considering RS overhead or feedback overhead, it may be difficult to newly define the N-Tx CSIRS and the PMI. As an alternative thereto, massive MIMO feedback may be supported using an existing M-Tx (M=8 or less) antenna CSI-RS and an M-Tx PMI. More specifically, one of the following two feedback mechanisms may be performed.

As a first feedback mechanism, some of massive antennas may be configured as CSI-RSs in each of multiple CSI processes to enable the UE to feed back the CSI per process. For example, CSI processes 1 and 2 are configured for one UE, CSI-RS 1 corresponding to the block A of FIG. 14 is configured for the process 1 and CSI-RS 2 corresponding to the block B of FIG. 14 is configured for the process 2. The UE performs feedback on CSI-RSs 1 and 2 using a CSI feedback chain configured for each of the two processes.

However, in this case, the following problems may occur.

As a first problem, the CQI of each CSI process indicates an MCS which is not obtained when massive antennas are all used but is obtained when only very few antennas of the massive antennas are used. In this case, it is difficult for the base station to receive the CQI of each CSI process to recalculate a CQI which may be obtained when the massive antennas are all used.

As a second problem, the RI of each CSI process indicates an RI which is not obtained when massive antennas are all used but is obtained when only very few antennas of the massive antennas are used. In this case, although the base station receives the RI of each CSI process to recalculate an RI which may be obtained when the massive antennas are all used, it is difficult to recalculate a CSI suitable for the recalculated RI.

As a third problem, the PMI of the CSI process does not indicate an optimal PMI used when the massive antennas are all used but indicates a PMI which may be obtained when very few antennas of the massive antennas are used.

In order to solve such problems, the following second feedback mechanism may be considered.

As the second massive MIMO feedback mechanism for solving the problems of the first feedback mechanism, one CSI process is configured for the UE and the UE feeds back an RI, a PMI and a CQI which may be obtained when the massive antennas are all used through the process. At this time, one IMR and L CSI-RSs corresponding to the massive MIMO antennas may be configured in one CSI process. That is, information related to the CSI process may be configured as follows.

CSI process information={IMR configuration, first CSI-RS configuration, second CSI-RS configuration, . . . , L-th CSI-RS configuration}

In this mechanism, the UE may estimate all massive MIMO channels from L CSI-RSs, divide all channels by K PMIs and perform feedback. Upon considering a current PUCCH feedback format, K PMIs may not be simultaneously fed back due to payload size limit. That is, if multiple PMIs respectively corresponding to multiple CSI-RSs are simultaneously fed back, overhead is large.

Accordingly, the following embodiments of the present invention are applicable in order to solve such a problem.

Embodiment of the Present Invention

The present invention relates to a method of, at a UE, feeding back CSI and also feeding back information indicating to which partial channel of all channels with a base station the CSI is related. In a massive MIMO environment having a large number of transmit antennas, the base station may notify one UE of some or all of channels of the transmit antennas through several CSI-RS configurations. At this time, ideally, the UE may simultaneously feed back the information on all the channels with the base station, which is quantized by a PMI. However, in consideration of feedback overhead, all the channels may be divided into several partial channels and PMIs corresponding thereto may be sequentially fed back. According to the present invention, the UE may update and feed back only a most efficient PMI and notify the base station, based on which partial channel the PMI is determined, thereby reducing feedback overhead.

More specifically, the UE may select one of K partial channels and feed back only a PMI corresponding to the selected partial channel. At this time, partial channel candidates, the CSIs of which may be fed back, should be predetermined between the base station and the UE and thus a separate control signal may be configured. If the partial channels A and B one-to-one correspond to different CSI-RSs, selection of the partial channels for CSI feedback has the same meaning as selection of CSI-RSs.

For example, the base station notifies the UE of the CSI-RS corresponding to the block A of FIG. 14 and the CSI-RS corresponding to the block B and the UE estimates downlink channels for vertical antennas through the CSI-RS corresponding to the block A to calculate a PMI and estimates downlink channels for horizontal antennas through the CSI-RS corresponding to the block B to calculate a PMI. When the former is a vertical PMI and the latter is a horizontal PMI, the partial channels A and B selected by the UE may mean the vertical PMI and the horizontal PMI, respectively. Alternatively, the partial channels A and B may not one-to-one correspond to the CSI-RSs. For example, the partial channel A may mean a composite channel of the channels estimated from two CSI-RSs and the partial channel B may mean a channel estimated from one CSI-RS.

Hereinafter, a method of, at a UE, selecting partial channel information and a method of feeding a CSI of a partial channel selected by a UE back to a base station will be described.

First Embodiment (Partial Channel Selection Method)

The first embodiment of the present invention relates to a method of, at a UE, selecting a partial channel.

More specifically, the UE may select an extremely changed partial channel and feed back a PMI. Since a previously sent PMI of a rarely changed partial channel may be valid to some extent, the PMI of the extremely changed partial channel is efficiently fed back.

Alternatively, the UE may select a partial channel such that a CQI obtained upon updating the PMI is maximized. The UE may calculate CQIs of all selectable partial channels and select a channel having a largest CQI.

Second Embodiment (Method of Feeding Back a Selected Partial Channel)

A second embodiment of the present invention relates to a method of, at a UE, feeding a selected partial channel back to a base station.

The UE selects one of all partial channel candidates and calculates and feeds back a PMI based on the selected partial channel. At this time, the base station should know to which partial channel the PMI fed back by the UE corresponds. As a simplest method of feeding back this information, information on a selected partial channel is fed back along with a PMI.

For example, as shown in FIG. 14, when two partial channels corresponding to the blocks A and B are present, the UE selects one of the two partial channels whenever the PMI is fed back and feeds back the PMI calculated based on the partial channel and the selected partial channel candidate.

Figure 15:
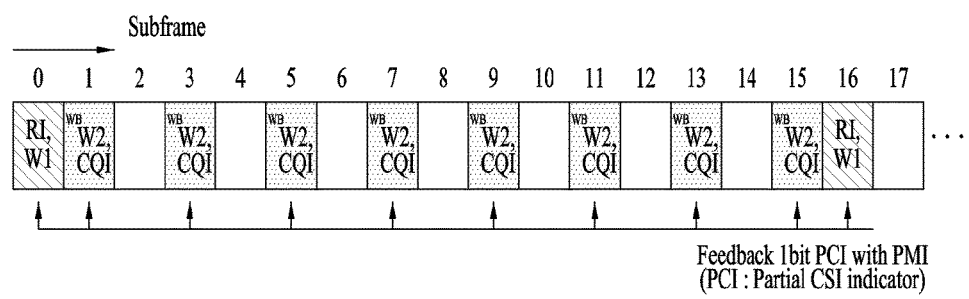
FIGS. 15 to 23 are diagrams showing an example of a feedback method according to an embodiment of the present invention.

FIG. 15 shows an example of a feedback configuration according to an embodiment of the present invention.

As shown in FIG. 15, if a feedback mode is configured, information indicating which partial channel is additionally selected (e.g., PCI: partial CSI indicator) is also fed back in all subframes in which W1 and W2 are fed back. In this case, since two partial channels are assumed, the PCI is expressed by 1 bit. The PCI values 0 and 1 mean partial channels corresponding to first column vertical antennas and first row horizontal antennas, respectively.

Although an independent PCI is basically fed back in all subframes in which W1 and W2 are fed back, a method of feeding back the PCI along with one of W1 or W2 may be used. For example, the PCI is fed back along with W1 and the CSI-RS of W2 is determined according to a recently reported PCI value. Meanwhile, in FIGS. 15, W1 and W2 mean respective codebooks in a dual codebook as in an LTE 8Tx codebook or an enhanced 4Tx codebook, the RI means a rank and the CQI means a channel quality indicator.

The partial channels may have different codebook structures (e.g., dual codebook or single codebook). For example, the block A of FIG. 14 uses a single codebook structure suitable for a ULA structure and the block B uses a dual codebook structure suitable for an X-Pol structure. To this end, the base station may signal a codebook to be used per channel to the UE. In this case, if the CSI feedback frame is configured according to a more complicated dual codebook and a single codebook PMI is fed back, the UE feeds back a single PMI instead of W1 or W2. Hereinafter, an embodiment will be described in detail.

If the codebook corresponding to the partial channel 1 has a dual structure including W1 and W2 and the codebook corresponding to the partial channel 2 has a single structure (e.g., release-8 LTE 4Tx codebook) in FIG. 15, feedback of the codebook of the partial channel 2 using the reporting structure of FIG. 15 is ambiguous. In this case, on the assumption that W1 joint-encoded with the RI is always a codebook corresponding to the partial channel 1, feedback is performed without the PCI and the PCI is fed back only when W2 is fed back. As a result, it is possible to indicate whether W2 shown in FIG. 15 is W2 of the partial channel 1 or the single PMI of the partial channel 2.

Alternatively, in order to prevent complexity caused due to different codebook structures, the UE may perform CSI feedback using the same codebook structure with respect to all partial channels.

In FIG. 15, the CQI is fed back along with the updated PMI. At this time, the CQI includes including the feedback time of the CQI and is a value which may be obtained when the base station performs massive MIMO using most recent PMIs. The RI may be a value obtained by joint encoding with respect to different ranks respectively corresponding to multiple CSI-RSs or a single value commonly applicable to the PMIs of all multiple CSI-RSs.

In addition, the embodiment of FIG. 15 relates to a method of feeding back the PCI whenever the PMI is fed back. In this case, since the PCI is frequently fed back, this method is inefficient in terms of overhead. For example, in FIG. 14, if the channel change rates of the partial channel 1 and the partial channel 2 respectively corresponding to the vertical antenna and the horizontal antenna are different, inefficiency increases. In this case, the PCI may be fed back at a longer period. For example, the UE feeds back the PCI and RI and reports the PMI corresponding to the same partial channel until a next PMI+RI is updated.

Alternatively, while the PCI is fed back along with the RI, the following operation may be performed. In the case of PCI=0, the PMI for the partial channel 1 is fed back during a predetermined time from a PCI report time and then the PMI for the partial channel 2 is fed back until a next PCI is reported. At this time, the predetermined time may be RRC-signaled from the base station to the UE in advance or may be fixed. In the case of PCI=1, the PMI for the partial channel 2 is fed back until a next PCI is reported from the PCI report time.

Figure 16:
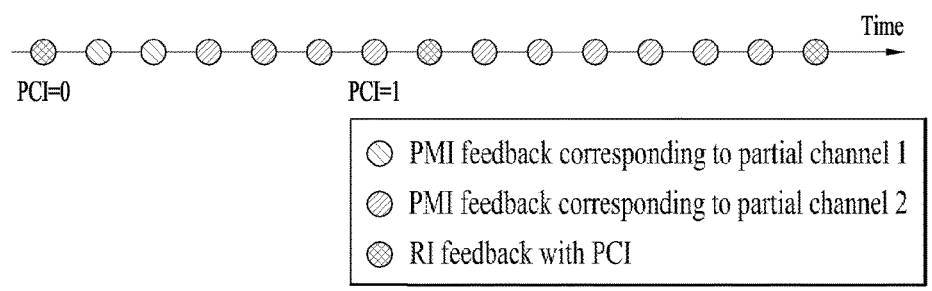

FIG. 16 shows an example of such a feedback method. If the channel change rate of the channel of the vertical antenna is less than that of the channel of the horizontal antenna, the partial channels 1 and 2 may be respectively mapped to the vertical antenna and the horizontal antenna and configured as shown in FIG. 16, thereby efficiently performing feedback.

Figure 17:
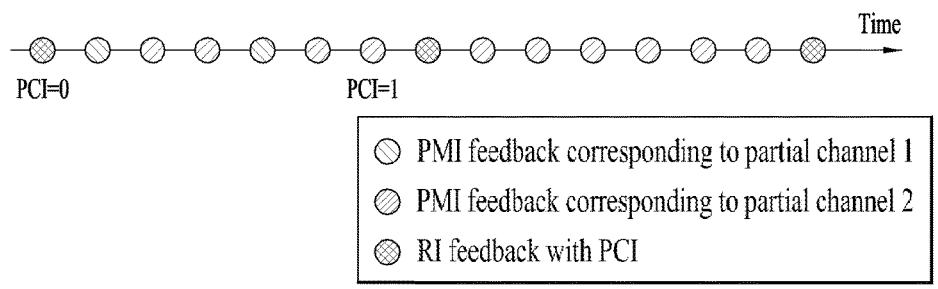

Although the PMI corresponding to the partial channel 1 is transmitted once during the predetermined period in FIG. 16, in the case of PCI=0, the PMI corresponding to the partial channel 1 may be fed back at a uniform time interval while maintaining a predetermined rate with the PMI corresponding to the partial channel 2. In FIG. 17, a feedback ratio of the PMI corresponding to the partial channel 1 to the PMI corresponding to the partial channel 2 is 1:2 and the PMIs are reported at a uniform interval. Such a feedback ratio may be transmitted from the base station to the UE.

Figure 18:
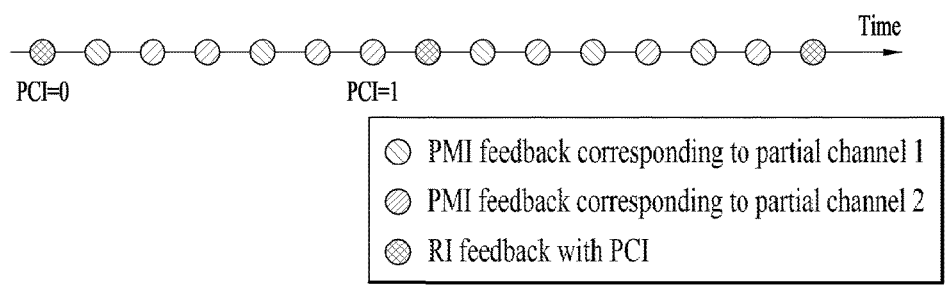

As another method, the feedback ratio of the PMI corresponding to the partial channel 1 to the PMI corresponding to the partial channel 2 may be differently set. FIG. 18 shows an example in which the two PMIs are reported at the uniform interval with a ratio of 1:2 in the case of PCI=0 and the two PMIs are reported at the uniform interval with a ratio of 1:1 in the case of PCI=1. Such a feedback ratio may be transmitted from the base station to the UE.

Figure 19:
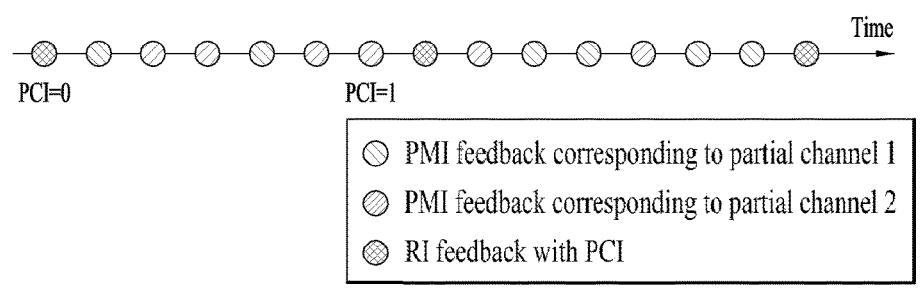

As another method, the feedback ratio of the PMI corresponding to the partial channel 1 to the PMI corresponding to the partial channel 2 may be changed according to the PCI value. For example, the feedback ratio of the two PMIs is set to 1:2 through signaling between the base station and the UE and how to map the feedback ratio of 1:2 to the two PMIs may be selected. FIG. 19 shows an example in which the PMI corresponding to the partial channel 2 and the PMI corresponding to the partial channel 1 are reported at a uniform interval with a ratio of 1:2 in the case of PCI=1.

Figure 20:
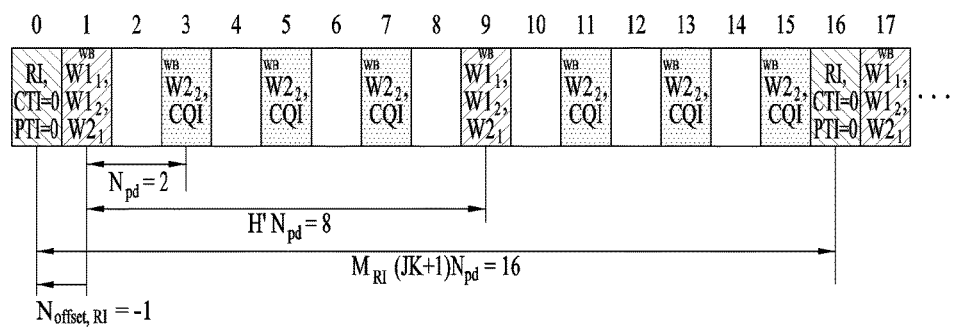
Figure 21:
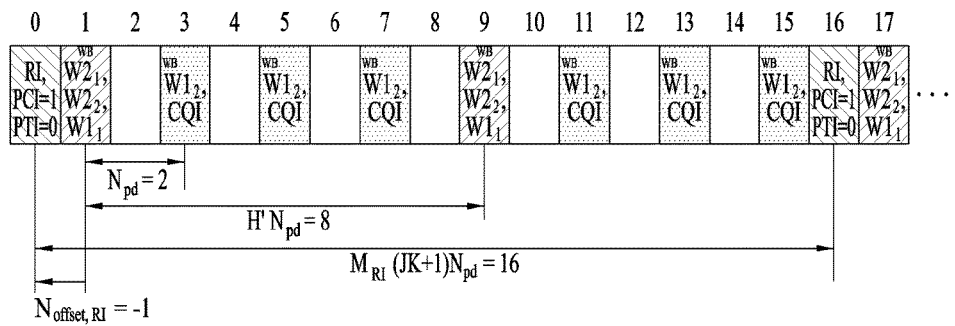
Figure 22:
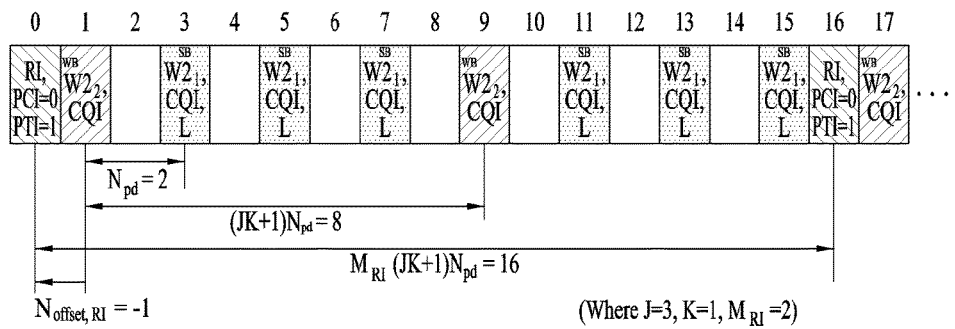
Figure 23:
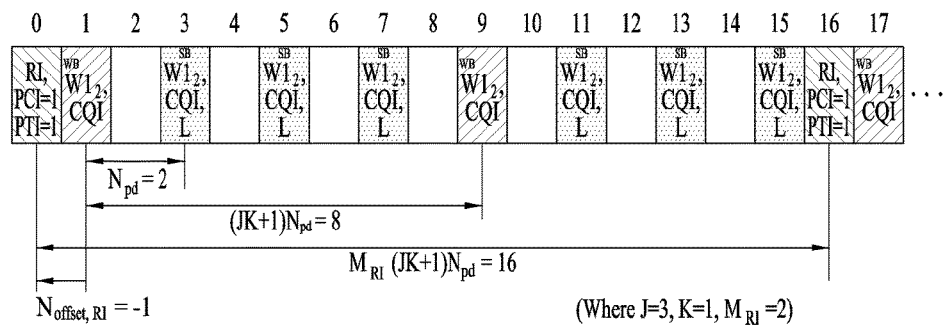

Upon using the PCI value as shown in FIG. 19 (that is, when the PCI is used to change the feedback ratio of the PMIs corresponding to the partial channels), the existing mode 2-1 may be changed as shown in FIGS. 20 to 23. FIG. 20 shows an example of PCI=1 and PTI=0, FIG. 21 shows an example of PCI=0 and PTI=1 and FIG. 22 shows an example of PCI=1 and PTI=1.

Here, the PMI feedback ratio of the two partial channels is set to 1:3 and Wi1 having long-term/wideband attributes is fed back at a period longer than that of Wi2 and thus is transmitted along with the PMI of another partial channel transmitted at a long period. That is, in the subframes 1 and 9 of FIGS. 20 and 21, the PMI for one partial channel and along-term/wideband PMI for the remaining partial channel are reported together.

In FIGS. 20 to 23, if the codebook of the partial channel 1 is a single codebook, one of W1-1 or W1-2 may be assumed as an identity precoder and may not be reported and the other of W1-1 or W1-2 may be replaced with a single codebook and may be reported. The same rule is applied to the case where the codebook of the partial channel 2 corresponding to the PMI is a single codebook.

Although the PCI is applied to PMI feedback in the above-described embodiment, the PCI is applicable to the remaining CSI feedback (e.g., RI or CQI).

For example, if the concept of the PCI is applied to the RI, the fed-back RI means the rank of the partial channel indicated by the PCI. In this case, in FIGS. 16 to 18, the PCI indicates from which partial channel the RI value transmitted along with the PCI is calculated.

If the concept of the PCI is applied to the CQI, the fed-back CQI means the CQI of the partial channel indicated by the PCI. In this case, in FIG. 15, the PCI indicates from which partial channel the CQI value transmitted along with the PCI is calculated. In addition, in FIGS. 16 to 18, CQI feedback is applicable using the same method as PMI feedback according to the PCI.

Figure 24:
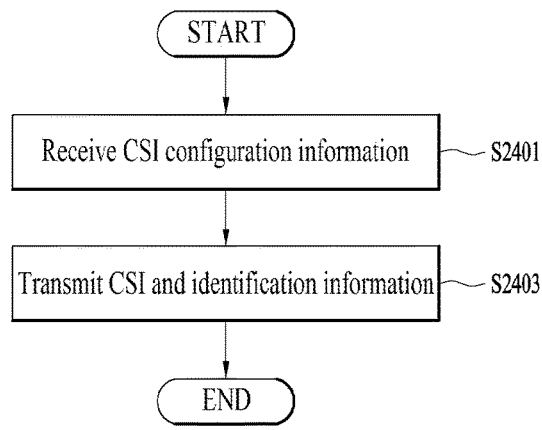
FIG. 24 is a flowchart illustrating an example of an embodiment of the present invention.

FIG. 24 is a flowchart illustrating an example of an embodiment of the present invention.

First, the UE receives CQI configuration information for CSI report (S2401). Next, a CSI and identification information of a partial channel corresponding to the CSI among all channels according to massive MIMO are transmitted based on the CSI configuration information (S2403). A detailed description thereof is equal to those of the first and second embodiments and thus will be omitted.

Figure 25:
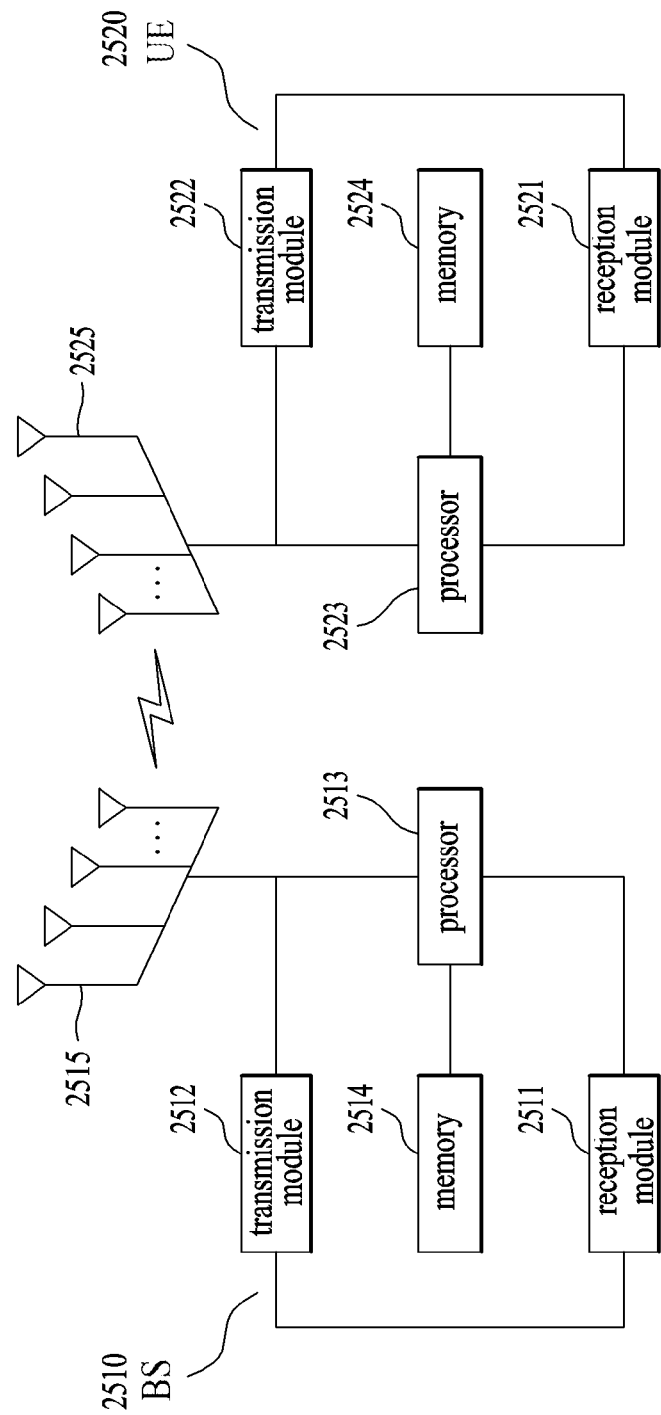
FIG. 25 is a diagram for configurations of a base station and a user equipment capable of being applied to one embodiment of the present invention.

FIG. 25 is a diagram for a base station and a user equipment capable of being applied to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 25, a wireless communication system includes a base station (BS) 2510 and a user equipment (UE) 2520. The BS 2510 includes a processor 2513, a memory 2514 and a radio frequency (RF) unit 2511/2512. The processor 2513 can be configured to implement the proposed functions, processes and/or methods. The memory 2514 is connected with the processor 2513 and then stores various kinds of information associated with an operation of the processor 2513. The RF unit 2516 is connected with the processor 2513 and transmits and/or receives a radio signal. The user equipment 2520 includes a processor 2523, a memory 2524 and a radio frequency (RF) unit 2521/2522. The processor 2523 can be configured to implement the proposed functions, processes and/or methods. The memory 2524 is connected with the processor 2523 and then stores various kinds of information associated with an operation of the processor 2523. The RF unit 2521/2522 is connected with the processor 2523 and transmits and/or receives a radio signal. The base station 2510 and/or the user equipment 2520 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The present invention may be used in wireless communication apparatuses such as a UE, a relay and a base station.

The invention claimed is:

1. A method of transmitting, by a user equipment (UE), channel state information (CSI) in a wireless access system supporting multiple input multiple output (MIMO), the method comprising:
   receiving, from a base station (BS), CSI configuration information for a plurality of partial channels;
   selecting at least one partial channel among the plurality of partial channels based on the CSI configuration information;
   transmitting, to the BS, a first CSI report including a first rank indicator (RI) and a first partial CSI indicator (PCI) which indicates a first partial channel;
   transmitting, to the BS, a second CSI report including at least one of a first precoding matrix indicator (PMI) and a first channel quality indicator (CQI), which is based on the first partial channel indicated by the first PCI;

transmitting, to the BS, a third CSI report including a second RI and a second PCI which indicates a second partial channel; and transmitting, to the BS, a fourth CSI report including at least one of a second PMI and a second CQI, which is based on the second partial channel indicated by the second PCI, wherein a ratio of a feedback frequency of the second CSI report to a feedback frequency of the fourth CSI report is configured based on the first PCI and the second PCI.

2. The method according to claim 1, wherein the first partial channel corresponds to antennas of a first column of an antenna array according to the MIMO when a PCI is the first PCI, and wherein the second partial channel corresponds to antennas of a first row of the antenna array according to the MIMO when a PCI is the second PCI.

3. The method according to claim 1, wherein the first partial channel is associated with a single codebook, and wherein the second partial channel is associated with a dual codebook.

4. A user equipment (UE) for transmitting channel state information (CSI) in a wireless access system supporting multiple input multiple output (MIMO), the UE comprising:

a radio frequency (RF) transceiver; and a processor, wherein the processor is configured to:

control the RF transceiver to receive, from a base station (BS), CSI configuration information for a plurality of partial channels, select at least one partial channel among the plurality of partial channels based on the CSI configuration information, control the RF transceiver to transmit, to the BS, a first CSI report including a first rank indicator (RI) and a first partial CSI indicator (PCI), which is based on the first partial channel indicated by the first PCI, control the RF transceiver to transmit, to the BS, a second CSI report including at least one of a first precoding matrix indicator (PMI) and a first channel quality indicator (CQI), which is based on the first partial channel indicated by the first PCI, control the RF transceiver to transmit, to the BS, a third CSI report including a second RI and a second PCI which indicates a second partial channel, and control the RF transceiver to transmit, to the BS, a fourth CSI report including at least one of a second PMI and a second CQI, which is based on the second partial channel indicated by the second PCI, wherein a ratio of a feedback frequency of the second CSI report to a feedback frequency of the fourth CSI report is configured based on the first PCI and the second PCI.

5. The UE according to claim 4, wherein the first partial channel corresponds to antennas of a first column of an antenna array according to the MIMO when a PCI is the first PCI, and wherein the second partial channel corresponds to antennas of a first row of the antenna array according to the MIMO when a PCI is the second PCI.

6. The UE according to claim 4, wherein the first partial channel is associated with a single codebook, and wherein the second partial channel selected CSI-RS resource is associated with a dual codebook.

7. The method according to claim 1, wherein the at least one partial channel is selected in which a channel change is the most severe in the wireless access system or a partial channel that maximizes a CQI that can be obtained in updating a PMI.

8. The UE according to claim 4, wherein the at least one partial channel is selected in which a channel change is the most severe in the wireless access system or a partial channel that maximizes a CQI that can be obtained in updating a PMI.

9. The method according to claim 1, wherein the first CSI report, the second CSI report, the third CSI report and the fourth CSI report are transmitted through a physical uplink control channel (PUCCH).

10. The UE according to claim 4, wherein the first CSI report, the second CSI report, the third CSI report and the fourth CSI report are transmitted through a physical uplink control channel (PUCCH).

* * * * *